United States Patent [19]

Gunn

[11] Patent Number: 4,544,195

[45] Date of Patent: Oct. 1, 1985

[54] REAR COVER FOR PICKUP TRUCK WITH ATTACHED RIGID CAMPER ENCLOSURE

[76] Inventor: Mary M. Gunn, 4321 Lonsdale, Louisville, Ky. 40215

[21] Appl. No.: 553,843

[22] Filed: Nov. 21, 1983

[51] Int. Cl.[4] ............................................... B60D 3/34
[52] U.S. Cl. ...................................... 296/26; 296/165; 135/88; 160/DIG. 2; 160/DIG. 18
[58] Field of Search ......................... 296/26, 165, 159; 135/88

[56] References Cited

U.S. PATENT DOCUMENTS

| Re. 29,264 | 6/1977 | Woodward | 296/159 |
| 4,065,166 | 12/1977 | Shoemaker | 296/26 |
| 4,192,543 | 3/1980 | Crawford | 296/159 |
| 4,332,265 | 6/1982 | Baker | 296/159 |

*Primary Examiner*—Robert R. Song
*Attorney, Agent, or Firm*—Maurice L. Miller, Jr.

[57] ABSTRACT

A cover for use with a conventional pickup truck having a tiltable tailgate upon which is mounted a conventional rigid camper enclosure of the type having a tiltable rear window panel and being accessible from the rear. The cover includes a flexible waterproof canvas sheet having a forward edge attached by a series of spaced snaps around the top and sides of the camper assembly at the rear end thereof, the sheet extending over and around the window panel and tailgate when in their rearwardly extending open positions. The sheet contains a vertically extending slit for rear access to the camper enclosure and one or more window openings. Flexible insect screens are positioned in registry with the window openings and contain cloth borders which are attached to the rear exterior surface of the sheet around the openings. Flexible plastic windows are attached along their upper surfaces to the interior surface of the sheet above the openings and having zipper material around the remaining sides and the adjacent interior surface of the sheet so that the windows may be rolled upwardly to a rolled, stored position above the openings when not in use. Privacy curtains are attached to the interior surface of the sheet and may also be rolled upwardly to a stored position above the openings when not in use.

14 Claims, 6 Drawing Figures

REAR COVER FOR PICKUP TRUCK WITH ATTACHED RIGID CAMPER ENCLOSURE

BACKGROUND OF THE INVENTION

This invention relates generally to a flexible cover attachable to the rear end of a conventional, rigid camper enclosure of the type adapted to mount over the bed of a conventional pickup truck.

Generally speaking, flexible covers for connection to the rear ends of various types of motor vehicles have long been known in the prior art. See, for example, the following prior art patents: U.S. Pat. No. 4,065,166 issued to B. C. Shoemaker on Dec. 27, 1977; U.S. Pat. No. Re. 29,264 reissued to F. W. Woodward on June 14, 1977; U.S. Pat. No. 2,246,813 issued to L. A. Preston on June 24, 1941; U.S. Pat. No. 3,744,957 issued to P. Basaraba on Nov. 27, 1973; and U.S. Pat. No. 4,310,194 issued to J. A. Biller on Jan. 12, 1982. Of these prior art references, only the patent to Biller discloses a flexible camper cover adapted for mounting on a pickup truck but the assembly thus disclosed is not adapted for use over the rear end of a pickup truck mounted rigid camper assembly of the type which is enjoying such wide popularity at the present time. The Biller assembly also requires the use of a relatively complex system of rigid fore, aft and central supports for the tent cover disclosed therein. Moreover, none of the references disclose a cover adapted to take advantage of the combination of a tiltable tailgate and tiltable window panel of a conventional pickup truck and associated rigid camper enclosure, respectively, to provide an enlarged camper enclosure whose useable length is extended by the length of the rearwardly projecting tailgate and panel when both are placed in their open positions.

By means of my invention, these and other problems associated with flexible covers used to cover the rear ends of motor vehicles for camping purposes are substantially overcome.

SUMMARY OF THE INVENTION

It is an object of my invention to provide a cover for a conventional rigid camper enclosure mounted over a bed of a conventional pickup truck for extending the useable interior length of the enclosure by the length of the rearward projecting tailgate and panel of the truck and enclusure, respectively.

Briefly, in accordance with my invention, I provide a cover for use on a conventional pickup truck of the type having a tailgate tiltable from an upright closed position downwardly to a horizontal open position and a rigid camper enclosure mounted over the bed of the truck having an upper rear panel tiltable from a vertically hanging closed position upwardly to a raised open position. The cover includes a flexible sheet extending over the rear and side edges of the panel and tailgate when in their open positions. The cover also includes a forward edge portion removably connectable along the side and upper rear edge portions of the camper enclosure. The sheet defines at least one window opening and a slit extending from a lower rear end of the sheet upwardly a distance at least sufficient to provide access to the camper enclosure. Also included is a screen disposed in registry with the window opening having a border attached to a surface of the sheet around the opening. A flexible window pane is disposed in registry with the opening. The pane is attached to a surface of the sheet around the opening and is at least partially detachable. Lastly, a curtain is attached to an interior surface of the sheet which has an operative position for covering the window opening and a stored position out of registry with the opening.

These and other objects, features and advantages of my invention will become apparent to those skilled in the art from the following detailed description and attached drawings upon which, by way of example, only a preferred embodiment of my invention is illustrated.

DESCRIPTION OF THE PREFERRED EMBODIMENT

Figure 2:
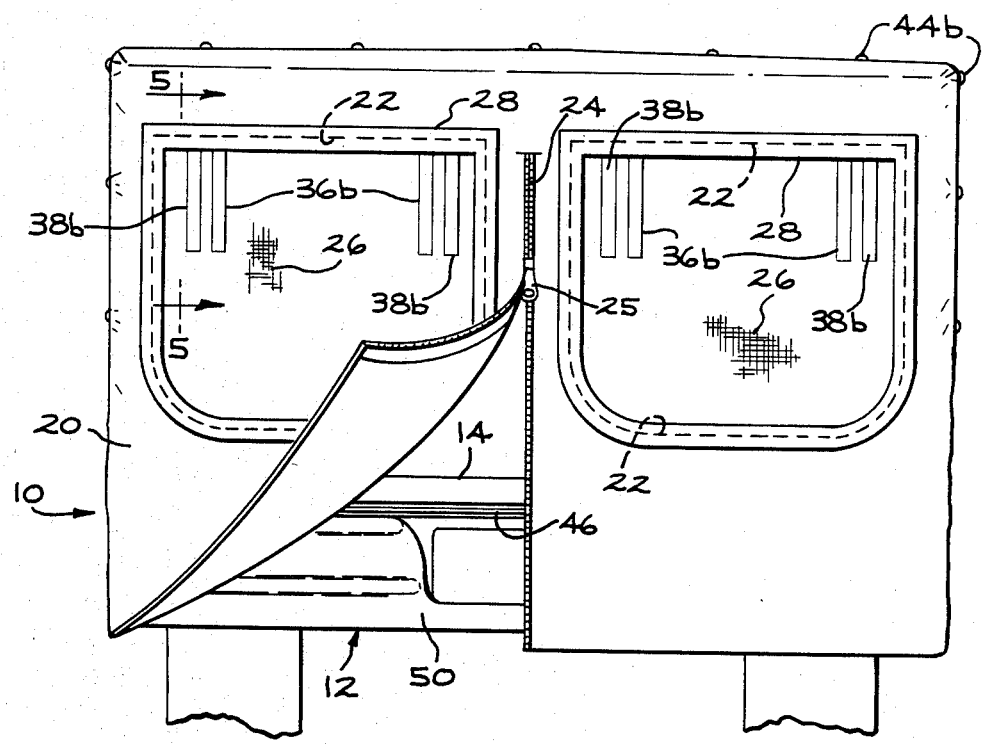
FIG. 2 is a rear end elevation view of the camper enclosure and cover of FIG. 1 with the near side portion of the cover replaced.

Referring now to the drawing figures, there is shown, in one preferred embodiment of my invention, a cover 10 for use on a conventional pickup truck 12 of the type having a tailgate 14 tiltable from an upright closed position downwardly to a horizontal open position (as shown) and a rigid camper enclosure 16 mounted over a bed of the truck 12 of the type having an upper rear panel 18, which may contain a window pane, tiltable from a vertically hanging closed position, upwardly to a raised position (as shown). The cover 10 includes a flexible sheet 20, preferably constructed of waterproof canvas, which is connected along forward edge portions thereof to rear side and top edge portions of the enclosure 16. The sheet 20 extends over the rear and side edges of the panel 18 and tailgate 14 when in their raised positions as shown and contains a pair of window openings 22 and a slit 24 (FIGS. 2-3 only) which extends from a lower rear end of the sheet 20 upwardly a distance at least sufficient to provide access to the enclosure 16. A zipper 25 is provided to secure the slit 24 in a closed position and should have handles on both sides of the sheet 20.

The cover 10 further includes a pair of insect screens 26 sewn or otherwise suitably attached to a corresponding pair of cloth borders 28, which may also be constructed of waterproof canvas. The borders 28 of the present example are sewn to the rear, exterior surface of the sheet 20 around the window openings 22 so that they slightly inwardly overlap the latter as indicated by the edge of the window openings 22 as shown by dashed lines 22 in FIG. 2. See also a portion of one of the borders 28 inwardly overlapping one of the window openings 22 in FIG. 3.

The cover 10 also includes a pair of flexible window panes 30, preferably constructed of a suitable clear plastic material, disposed in the openings 22 and attached therearound to the forward, interior surface of the sheet 20. While the panes 30 may be completely removably attached to the sheet 20, I prefer to permanently sew the upper edge portions of the panes 30 to upper opening defining edge portions of the sheet 20 and removably attach the remaining sides and lower edge portions of the panes 30 to the remaining opening defining edge portions of the sheet 20 so that the panes 30 may be rolled upwardly to a stored position above the openings 22 when not in use. See one of the panels 30 in such a rolled, stored position in FIG. 6. To facilitate such a partially detachable feature of the panes 30, a pair of zippers 32 are sewn between and along the remaining forward, interior edge portions of the panes 30 and corresponding forward, interior edge portions of the sheet 20 which define openings 22 as shown most clearly in FIG. 3.

Figure 1:
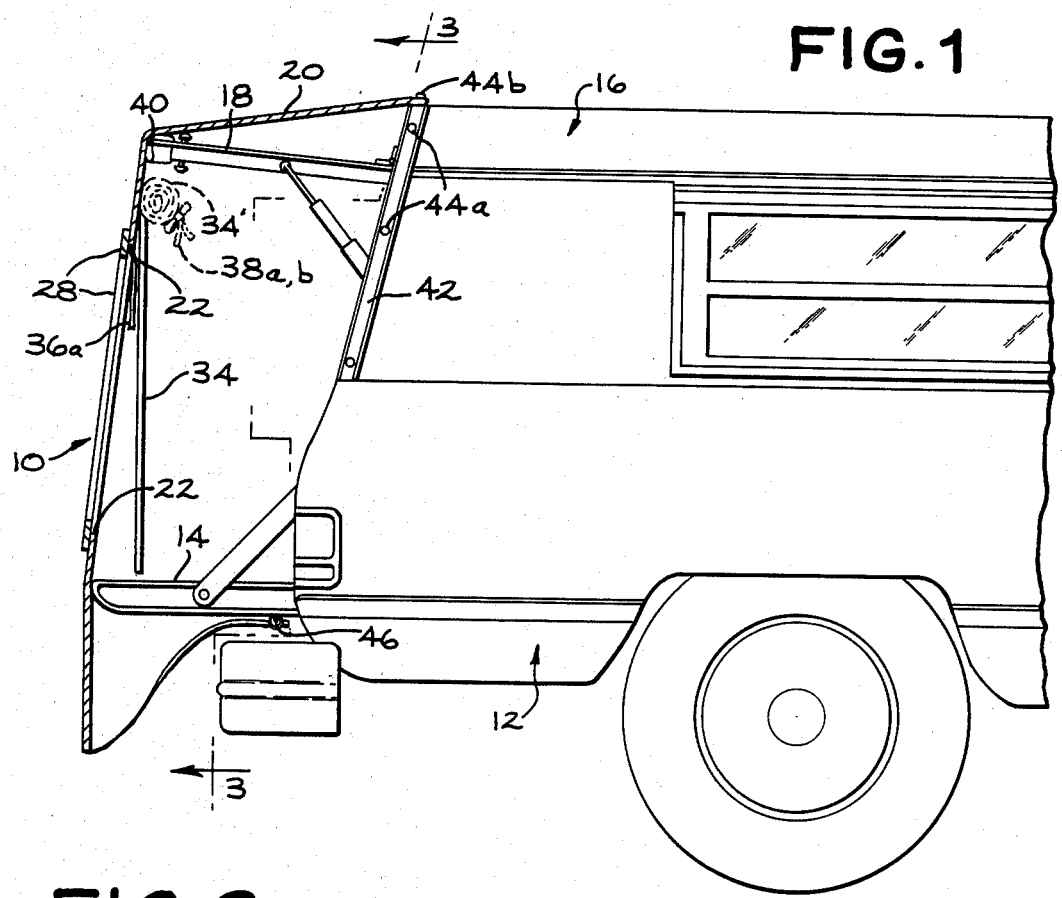
FIG. 1 shows a fragmented side elevation view of a conventional pickup truck with rigid camper enclosure upon the rear end of which is attached a flexible fabric cover with a near side portion of the cover broken way for clarity, thus illustrating one preferred embodiment of my invention.
Figure 3:
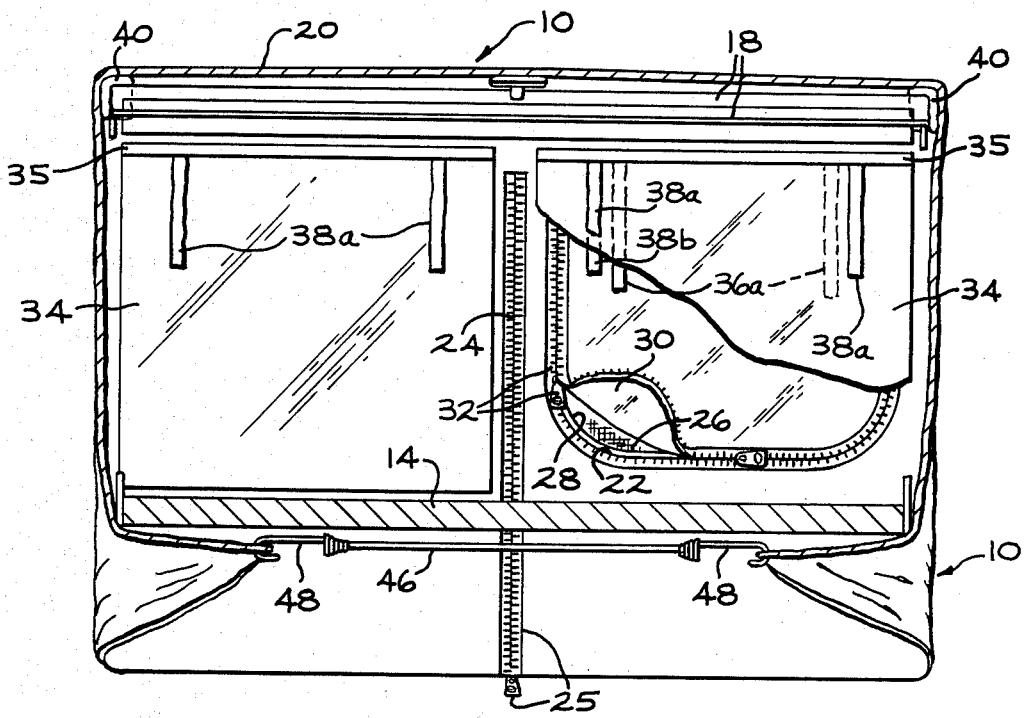
FIG. 3 shows a cross-sectional end elevation view of the truck and cover of FIGS. 1-2 as viewed along cross-section lines 3—3 of FIG. 1 with a flexible curtain and window pane portion of the cover being shown in an extended operative position.
Figure 4:
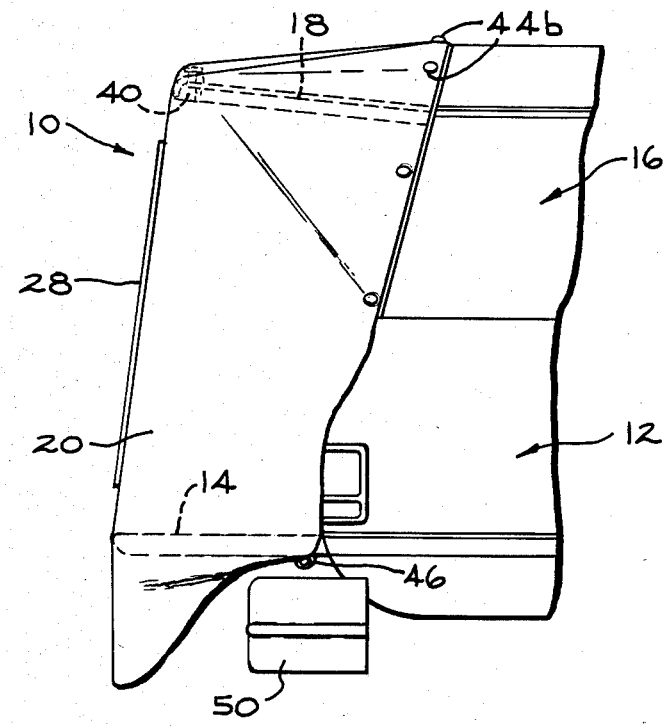
FIG. 4 shows a fragmented full side elevation view of the truck, enclosure and cover of FIGS. 1-3.
Figure 5:
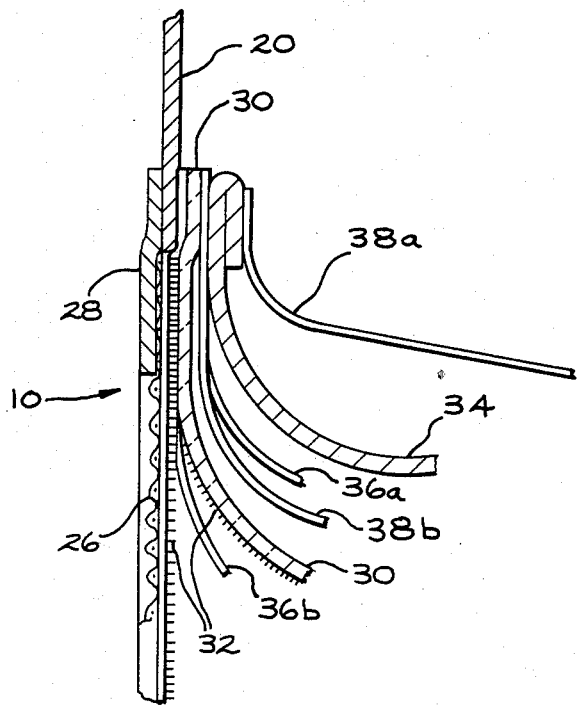
FIG. 5 shows a cross-sectional elevation view of an edge portion of the cover of FIGS. 1-4 as viewed along cross-sectional lines 5—5 of FIG. 2.

The cover 10 also includes a pair of privacy curtains 34 which, in the present example, are sewn along upper edge portions 35 (See FIG. 3) thereof to the forward, interior surface of the sheet 20 above the line along which the upper edge portions of the panes 30 are sewn so that the curtains 34 hang vertically in front of and across the openings 22 when in use (See FIGS. 1 and 3). The curtains 34 are rollable upwardly into a rolled, stored position above the rolled, stored position of the panes 30 when not in use. See one of the curtains 34 in a rolled, stored position as shown in phantom in FIG. 1 as at 34', and in full in FIG. 6.

Figure 6:
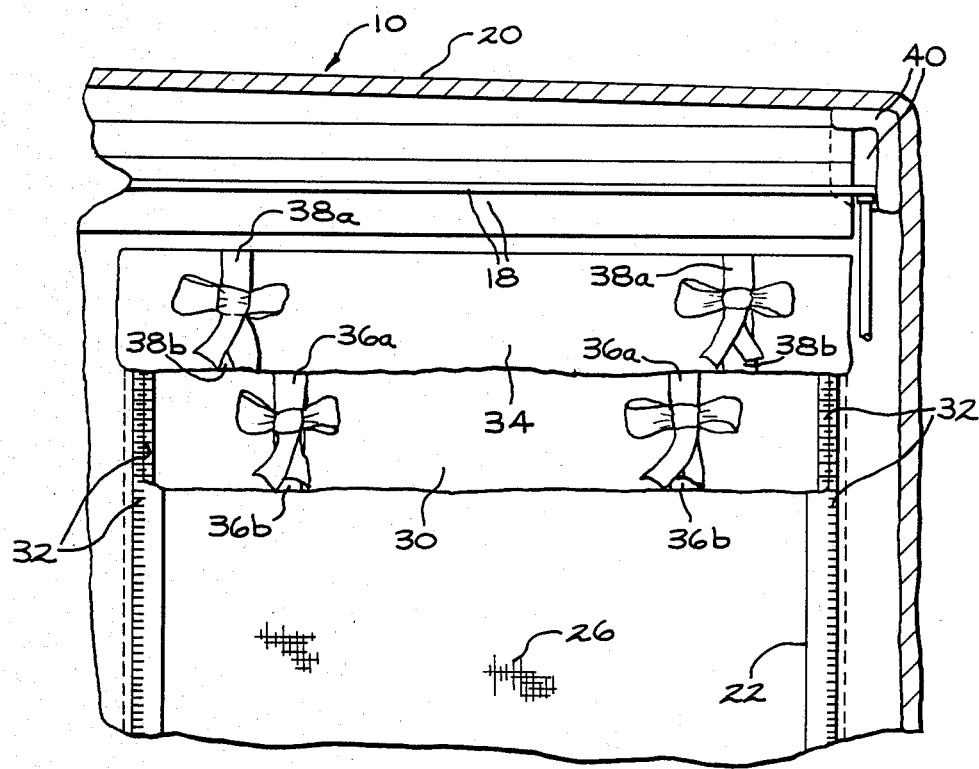
FIG. 6 shows an enlarged fragmented portion of the truck and cover of FIGS. 1-4 the same as viewed in FIG. 3 with the flexible curtain and window pane portion of the cover being shown in a rolled, stored position.

Each of the windows 30 are secured in their rolled, stored positions by means of two pairs of elongated flexible cloth strips 36a,b, upper end portions of which are attached to the forward, interior surface of the sheet 20 along or near the line along which the upper edges of the panes 30 are sewn. The strips 36a are positioned to hang in front of the panes 30 and cooperating strips 36b are positioned to hang behind the panes 30 and strips 36a so that when the panes 30 are rolled upwardly to their stored position, each pair of cooperating strips 36a,b may be tied around the rolled panes 30 to maintain them as shown in FIG. 6. Similarly, each of the curtains 34 are secured in their rolled, stored positions by two pairs of elongated and cooperating flexible cloth strips 38a,b sewn along upper end portions behind and in front of the curtains 34, respectively. In order to avoid having the relatively sharp corners of the panel 18 tear the fabric of the overlying sheet 20, I recommend inserting a pair of pads 40 of suitable material such as foam pads therebetween.

Certain camper enclosures manufactured and in use at the present time contain an elongated trim element 42 extending around the outside top and sides on a rear end portion thereof. The trim element 42 includes a strip of vinyl plastic confined between two thin strips of metal. In such cases, I find it convenient to attach a series of conventional snap elements 44a in spaced relation along and to the vinyl strip and attach a similar series of mating snap elements 44b in similarly spaced relation along the forward edge portion of the sheet 20 which overlies the trim strip 42. In this manner, the sheet 20 is readily attachable to and detachable from the enclosure 16. I also find it desirable to secure the lower sides of the sheet 20 reasonably tightly against the sides of the tailgate 14 to inhibit the lower end of the cover 10 from flapping violently in wind and rain storms and to inhibit insects from entering the enclosure 16. To accomplish this, I provide an elastic cord or rope 46 with hooks 48 attached at the ends and connect the same between holes formed in forward lower ends of the sheet 20 so that the rope 46 extends across the rear end of the truck 12 between a truck bumper 50 and the tailgate 14 and draws the forward lower ends of the sheet 20 toward one another as shown most clearly in FIG. 3. Accordingly, by means of my invention, the cover 10 provides a tent-like assembly over the rear end of the truck 12 and camper enclosure 16 for use when camping to provide an enlarged enclosure facility, wherein the useful length of the enclosure is extended by the distance of the rearwardly extending tailgate 14 and panel 18 when placed in their horizontal open positions as shown.

Although the present invention has been explained with respect to specific details of a certain preferred embodiment thereof, it is not intended that such details limit the scope of the following claims other than as specifically set forth herein.

I claim:

1. A cover for use on a conventional pickup truck of the type having a tailgate tiltable from an upright closed position downwardly to a horizontal open position and a rigid camper enclosure mounted over a bed of said truck having an upper rear panel tiltable from a vertially hanging closed position upwardly to a raised open position, said cover comprising
   a flexible sheet extending over rear and side edges of said panel and tailgate when in their open positions and having a forward edge portion removably connectable along side and upper rear edge portions of said camper enclosure, said sheet defining at least one window opening therein and a slit extending from a lower rear end of said sheet upwardly a distance at least sufficient to provide access to said camper enclosure,
   a screen disposed in registry with said window opening and having a border attached to a surface of said sheet around said opening,
   a flexible window pane disposed in registry with said opening, said pane being attached to a surface of said sheet around said opening and being at least partially detachable,
   a curtain attached to an interior surface of said sheet having an operative position for covering said window opening and a stored position out of registry with said opening, and
   means for connecting lower forward side portions of said sheet across the rear end of said truck for drawing the lower sides of said sheet against the sides of said tailgate, said connecting means comprising a cord having hook terminating ends tautly connected between opposite lower forward corner portions of said sheet, said cord extending across the underside of said tailgate from one side to the other thereof.

2. The cover of claim 1 wherein said window pane is fixedly attached along an upper edge portion thereof to said sheet above said window opening and is removably attached to said sheet along side and lower edge portions of said window opening.

3. The cover of claim 1 wherein the border of said screen is attached to an exterior surface portion of said sheet.

4. The cover of claim 1 wherein an upper edge portion of said curtain is attached to said interior surface along a line above said window opening and hangs vertically downward across said window opening when in said operative position and is rollable upwardly to a rolled, stored position near said attachment line, said cover further comprising means for securing said curtain in said rolled, stored position.

5. The cover of claim 1 further comprising means for connecting edge portions of said sheet on both sides of the slit to one another for securing said slit in a closed position.

6. The cover of claim 1 wherein said sheet is constructed of a substantially waterproof material.

7. The cover of claim 1 wherein said screen is constructed of a flexible material.

8. The cover of claim 2 wherein said window pane is constructed of a flexible plastic material and is rollable upwardly to a rolled, stored position below the stored position of said curtain, said cover further comprising means for securing said window pane in said stored position.

9. The cover of claim 2 further comprising zipper means for removably attaching said window pane along side and lower edge portions of said window opening.

10. The cover of claim 4 wherein said curtain securing means comprises at least one pair of elongated strips of fabric, an upper end portion of one of said strips being attached to the interior surface of said sheet such that said one strip hangs downwardly behind said curtain, when said curtain is in said operative position, an upper end portion of the other of said strips being attached to an upper edge portion of the front surface of said curtain such that said other strip hangs downwardly in front of said curtain when said curtain is in said operative position, whereby said pair of strips can be tied together to secure said curtain in said rolled, stored position.

11. The cover of claim 1 wherein said lower forward side portion connection means comprises an elastic cord.

12. The cover of claim 6 wherein said connecting means for securing said slit comprises a zipper.

13. The cover of claim 8 wherein said window pane securing means comprises at least one pair of elongated strips of fabric, an upper end portion of one of said strips being attached to the interior surface of said sheet such that said one strip may hang downwardly behind said window pane when said window pane is in an operative position, an upper end portion of the other of said strips being attached to an upper edge portion of the front surface of said window pane such that said other strip may hang downwardly in front of said window pane when said window pane is in an operative position, whereby said pair of strips can be tied to one another to secure said window pane in said rolled, stored position.

14. The cover of claim 1 wherein said sheet is snappably connectable along side and upper rear edge portions of said camper enclosure.

* * * * *